United States Patent
Srinivas

[11] Patent Number: 6,075,996
[45] Date of Patent: Jun. 13, 2000

[54] INTERMEDIATE FREQUENCY SELECTING DEVICE FOR USE IN DUAL BAND CELLULAR TELEPHONE AND METHOD THEREOF

[75] Inventor: Guda Srinivas, Suwon, Rep. of Korea

[73] Assignee: Samsung Electronics Co., Ltd., Rep. of Korea

[21] Appl. No.: 08/977,986

[22] Filed: Nov. 25, 1997

[30] Foreign Application Priority Data

Nov. 28, 1996 [KP] DPR of Korea .................. 96-58951

[51] Int. Cl.[7] .................. H04Q 7/20; H04B 1/38
[52] U.S. Cl. .................. 455/552; 455/553; 455/76; 455/180.1; 455/313
[58] Field of Search .................. 455/552, 553, 455/76, 180.1, 260, 313, 323; 327/126

[56] References Cited

U.S. PATENT DOCUMENTS

| | | | |
|---|---|---|---|
| 4,330,687 | 5/1982 | Foulkes et al. | 327/126 |
| 4,823,373 | 4/1989 | Takahashi et al. | 455/553 |
| 4,972,455 | 11/1990 | Phillips et al. | 455/76 |
| 5,448,762 | 9/1995 | Ward | 455/76 |
| 5,564,076 | 10/1996 | Auvray | 455/76 |
| 5,722,053 | 2/1998 | Kornfeld et al. | 455/76 |
| 5,884,149 | 3/1999 | Jaakola | 455/553 |
| 5,896,562 | 4/1999 | Heinonen | 455/76 |

*Primary Examiner*—Dwayne D. Bost
*Assistant Examiner*—Quochien B. Vuong
*Attorney, Agent, or Firm*—Dilworth & Barrese

[57] ABSTRACT

A dual band cellular telephone includes an antenna, a power amplifier, RF transmission and reception chains, first and second local oscillators, and IF transmission and reception chains. In order to select an intermediate frequency, processing circuitry within the telephone determines center frequencies of transmission radio frequency sweep ranges of first and second bands, calculates a difference between the center frequencies of the first and second transmission bands, and multiplies the calculated difference value by a scaling coefficient to calculate a center local oscillating frequency associated with one of the RF transmission bands. It then subtracts the transmission center frequency of one of the RF transmission bands from the local oscillator center frequency to determine the transmission intermediate frequency. Preferably, the cellular telephone has a single local oscillator for transmit and a single local oscillator for receive. The IF selection method enables the same IF frequency separation between transmit and receive when operating at any frequency in the dual band system.

18 Claims, 3 Drawing Sheets

INTERMEDIATE FREQUENCY SELECTING DEVICE FOR USE IN DUAL BAND CELLULAR TELEPHONE AND METHOD THEREOF

BACKGROUND OF THE INVENTION

1. Field of the Invention

The present invention relates to wireless communication systems, and more particularly, to cellular telephone electronics for use in a dual band cellular system.

2. Description of the Related Art

A cellular telephone includes a radio frequency (RF) section and a baseband controller. The RF section up-converts a modulated intermediate frequency (IF) signal from a modem unit into RF energy in a transmission mode, and down-converts a received RF signal into an IF signal in a reception mode. Such an RF section generally includes a plurality of mixers, automatic gain controllers, filters, local oscillators, and amplifiers.

In a cellular system, the radio frequency used for transmitting is usually different from the frequency used for reception. Each system has various methods for discriminating the frequencies. The method for selecting the intermediate frequencies during the transmission and reception modes is influenced by many different factors. To simplify the hardware and lower the cost, the intermediate frequencies during transmission and reception should be selected such that a separation of the intermediate frequencies accurately coincides with a separation of the radio frequencies. In this case, it is possible to use a single local oscillator for both the transmission and reception chains. Other components of the cellular telephone include an IF transmission chain, an IF reception chain, an RF transmission chain, and an RF reception chain.

Referring to FIG. 1, a conventional single band cellular telephone includes a modem section and an RF section. The modem section consists of a modem unit 100. The RF section includes an antenna 101, a duplexer 102 for duplexing transmission and reception signals, a low noise amplifier (LNA) 103, an RF reception bandpass filter 105, a power amplifier 104, an RF transmission bandpass filter 106, mixers 107 and 108, a local oscillator 109 for the reception chain, an IF reception bandpass filter 110, an IF reception automatic gain controller 112, an IF transmission bandpass filter 111, and a selective variable gain amplifier 113. In the system, the single local oscillator can be used for both the transmit and receive chains.

Prior art cellular telephones capable of use in dual band systems typically utilize three local oscillators. A first local oscillator is used for both transmit and receive when operating in a first of the two bands, similar to the configuration of FIG. 1. Second and third local oscillators are used for the transmit and receive paths, respectively, when operating in the second band. The three local oscillators are employed in this manner in order to maintain the same frequency separation between the transmit and receive IF frequencies, regardless of which operating band is being used.

SUMMARY OF THE DISCLOSURE

It is an object of the present invention to provide an improved method for selecting intermediate frequencies in transmit and receive paths of a cellular telephone, and to realize a compact dual band cellular telephone with a reduced cost.

It is another object of the present invention to provide a device and method for programming and switching first and second local oscillators so as to automatically operate within different cellular telephone systems.

In a preferred embodiment of the invention, a dual band cellular telephone includes an antenna, a power amplifier, RF transmission and reception chains, first and second local oscillators, and IF transmission and reception chains. In order to select an intermediate frequency, processing circuitry within the telephone determines center frequencies of transmission radio frequency sweep ranges of first and second bands, calculates a difference between the center frequencies of the first and second transmission bands, and multiplies the calculated difference value by a scaling coefficient to calculate a center local oscillating frequency associated with one of the RF transmission bands. It then subtracts the transmission center frequency of one of the RF transmission bands from the local oscillator center frequency to determine the transmission intermediate frequency. Preferably, the cellular telephone has a single local oscillator for transmit and a single local oscillator for receive. The IF selection method enables the same IF frequency separation between transmit and receive when operating at any frequency in the dual band system.

BRIEF DESCRIPTION OF THE DRAWINGS

The above and other objects, features and advantages of the present invention will become more apparent in the light of the following detailed description of an exemplary embodiment thereof, taken in conjunction with the attached drawings in which.

DETAILED DESCRIPTION OF THE PREFERRED EMBODIMENT

Figure 1:
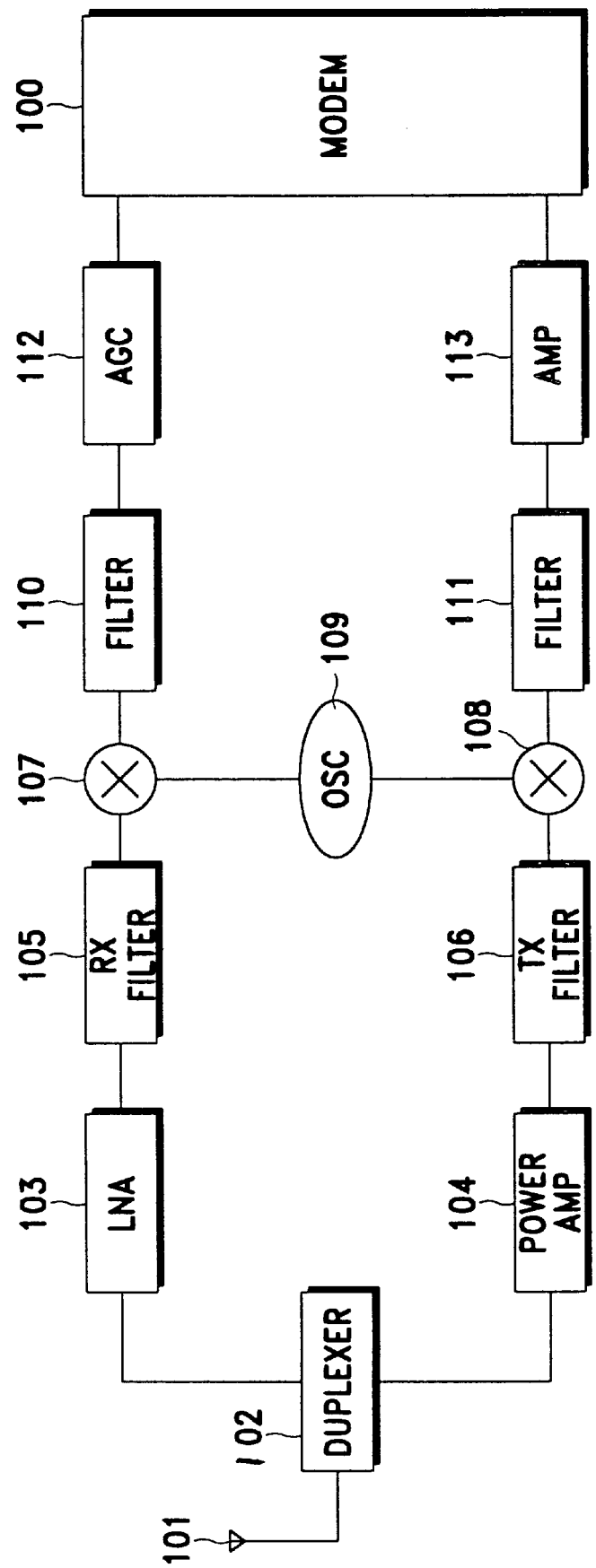
FIG. 1 is a block diagram of a single band cellular telephone according to the prior art.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions of the related prior art may be intentionally omitted if it is believed to be unnecessary in describing the concepts of the present invention.

The present invention is directed to reducing the complexity and manufacturing cost of dual band cellular telephones. In accordance with the present invention, a dual band cellular telephone has a reduced number of local oscillators as compared to prior art cellular telephones. The present invention employs two local oscillators, one for the transmit path and one for the receive path, while the same IF frequency separation between the transmit and receive IF is maintained for each of the two operating bands.

Figure 2:
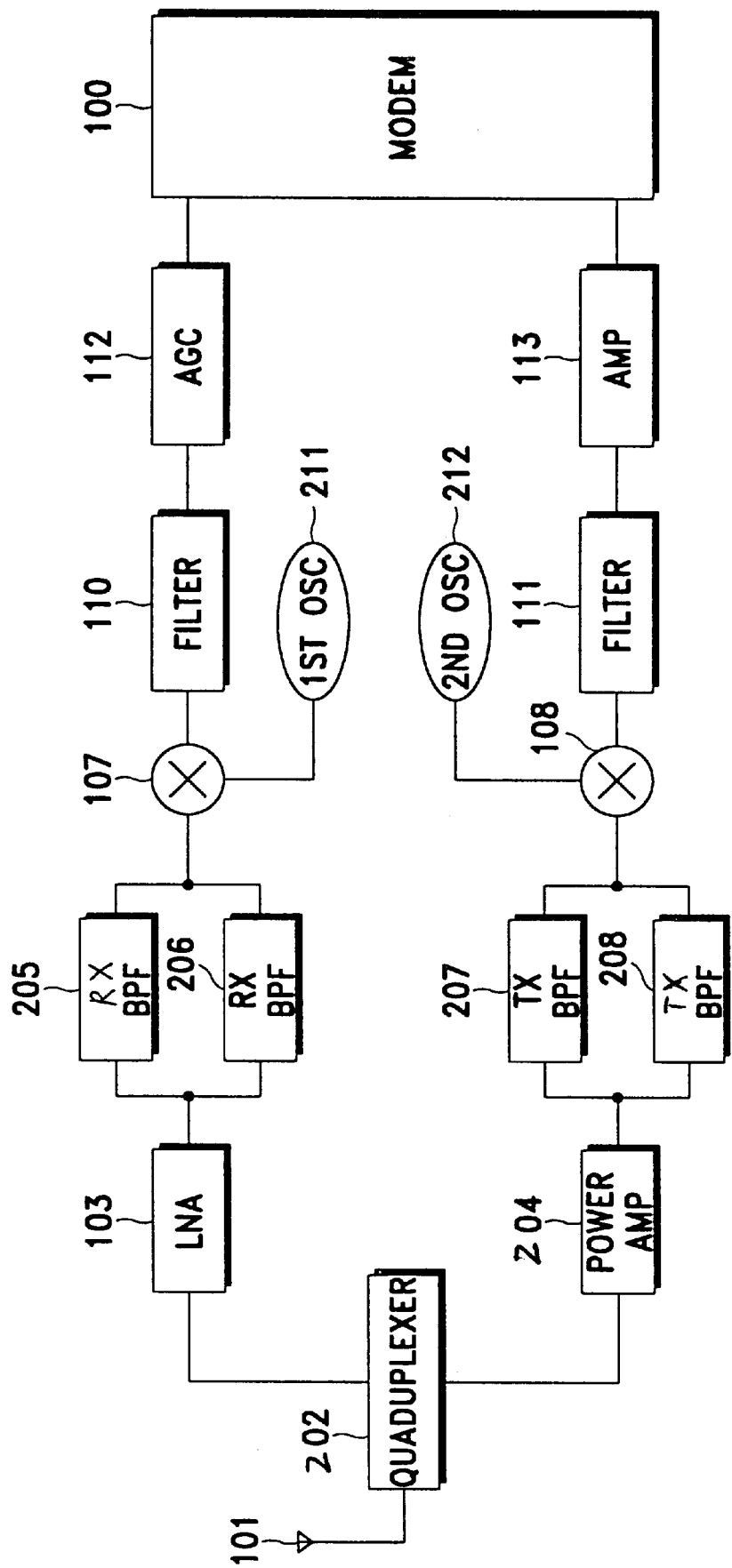
FIG. 2 is a block diagram of a dual band cellular telephone according to an embodiment of the present invention.

The present invention presents a method for designing a dual cellular telephone having only two frequency synthesizers, as illustrated in FIG. 2. The intermediate frequencies are determined by an algorithm described hereinbelow. The intermediate frequencies are fine-tuned to acquire a step size suitable for the frequency synthesizer.

Referring to FIG. 2, a dual band cellular telephone according to the present invention includes a modem unit 100 and an RF section, the latter of which includes the other shown components in FIG. 2. These include a dual band antenna 101, a quadruplexer 202 for separating transmission and reception signals of the dual band, and a dual band low noise amplifier 103, RF reception bandpass filters 205 and 206, having different passbands, are used for first and second receive bands, respectively, of the dual band. Transmission bandpass filters 207 and 208 likewise have different passbands from one another to pass respective first and second transmit bands of the dual band. Also included are a dual band power amplifier 204, mixers 107 and 108, a first local oscillator 211 for the reception chain, a second local oscillator 212 for the transmission chain, an IF reception bandpass filter 110, an IF reception automatic gain controller 112, an IF transmission bandpass filter 114, and a selective variable gain amplifier 113.

By way of example, it is assumed in the specification that the cellular telephone operates at an 800 MHz Code Division Multiple Access (CDMA) band (first band) and at a 1900 MHz Personal Communications Services (PCS) band (second band). A CDMA system has a transmission frequency band of 824–849 MHz and a reception frequency band of 869–894 MHz. A PCS system has a transmission frequency band of 1850–1910 MHz and a reception frequency band of 1930–1990 MHz. It is noted that the RF frequency difference between transmit and receive of the first band is 45 MHz, while the RF frequency difference between transmit and receive of the second band is 80 MHz. In order to select transmit and receive IF frequencies that have the same frequency separation (between transmit and receive) for both bands, the conventional system employs a single frequency synthesizer for the first band, and two other frequency synthesizers for the second band, one for the transmit chain and the other for the receive chain.

In accordance with the embodiment of the present invention as shown in FIG. 2, a single transmission chain local oscillator 212 and a single reception chain local oscillator 211 are employed. Each of the local oscillators 211 and 212 includes a switch (not shown) to select a desired one of the two bands. The IF frequencies are selected such that a frequency LO1 from local oscillator 211 is used for the second band, and half that frequency (i.e., LO1÷2) from local oscillator 211 is used for the first band. Control signals for the switch and specific carrier frequencies are programmed by a baseband controller of the cellular telephone. The switch selects paths according to which operating band is selected, as illustrated in FIG. 3.

Figure 3:
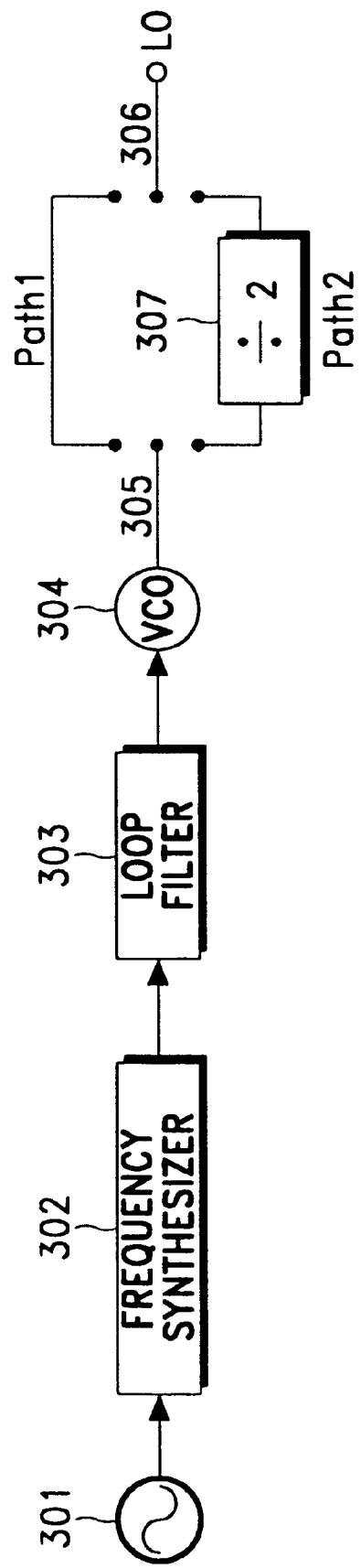
FIG. 3 is a block diagram of a local oscillator in the dual band cellular telephone according to an embodiment of the present invention.

Referring to FIG. 3, exemplary circuitry for either one of the local oscillators 211 and 212 is shown. As illustrated, the local oscillator includes a reference oscillator 301, a frequency synthesizer 302, a loop filter 303, a voltage controlled oscillator (VCO) 304, and first and second switches 305 and 306 for switching a signal to either a first path (Path 1) or a second path (Path 2). Path 1 is a direct path for the second (higher frequency) band, while Path 2 is a path for the first (lower frequency) band. A prescalar (÷2) 307 is used in the second path to reduce the frequency of the signal by a factor of two. When the higher band is selected, the signal is transferred through Path 1, whereas if the lower band is selected, the signal is transferred through Path 2 including the prescalar 307. A signal LO, i.e., LO1 if Path 1 is chosen or LO1÷2 if Path 2 is chosen, is outputted from switch 306. The receive path local oscillator operates in the same manner as the transmit path local oscillator. That is, on receive, the local oscillation signal for the lower frequency receive band is switched through Path 2 while that for the higher frequency receive band is switched through Path 1.

An algorithm described hereinbelow is used when selecting a proper intermediate frequency, in which only two frequency synthesizers can be used. In the transmission chain of the dual band cellular telephone, the intermediate frequency can be selected as set forth in the following discussion:

It is assumed that a center frequency of the RF transmission signal of the lower band is X1 and a center frequency of the higher band is X2. Further, a common IF frequency with respect to the two bands is Y. A local oscillation frequency range associated with the higher band overlaps a local oscillation frequency range associated with the lower band. Such a frequency overlapping method requires a low frequency range for voltage controlled oscillator 304. This low frequency range is almost the same as the range required in the conventional single band operation. In light of the foregoing, the dual band range is achieved without a reduction in the phase noise of the frequency synthesizers. Thus, the relation can be expressed by the following Equations (1)–(3).

$$Z = X2 + Y \qquad (1)$$

$$Z/2 = X1 + Y \qquad (2)$$

$$Z = 2*X1 + 2*Y, \qquad (3)$$

where the local oscillating frequency Z or Z/2 is assumed in this example to be higher than the corresponding RF frequency.

From Equations (1), (2) and (3), the relation can be rewritten as shown in Equations (4) and (5):

$$Z = 2*(X2-X1) \qquad (4)$$

$$Y = Z - X2 \qquad (5)$$

where X1 represents a center frequency of the RF frequency range of the lower band, X2 represents a center frequency of the RF frequency of the higher band, Y represents a center intermediate frequency associated with each of the above two bands, and Z represents a center frequency of the local oscillation frequency range of the higher band. The Z/2 value provides a center frequency of the local oscillation frequency range used at the lower band. Start and stop frequencies of the local oscillator are determined from the center frequency value and the frequency range of a particular band.

Similar frequency selection is implemented in the receive chain of the cellular telephone electronics. The local oscillation frequency ranges of the two receive bands are overlapped with each other, where the center of the local frequency range of the higher receive band is twice that of the lower receive band. A prescalar (e.g., frequency divider) is used in the second path, Path 2, of the local oscillator with respect to the lower receive band. A voltage controlled oscillator 304 of a low sweep range is needed to overlap the local oscillation frequencies. The sweep range approximately coincides with a sweep range of the lower band. Thus, the phase noise of the local oscillator in the dual band cellular system will not be reduced.

For either the transmit or receive local oscillators 211 or 212, the start frequency and step size are different according to the bands, and the frequency synthesizer is programmed so as to generate a proper frequency. Since the signal at the first band is transferred through the voltage controlled oscillator 304 and the prescalar 307, a frequency generated from the voltage controlled oscillator 304 is twice the above frequency. Further, the step size of the voltage controlled oscillator 304 becomes twice as large. Therefore, the loop bandwidth becomes higher, the lock time becomes faster, and attenuation of reference spurious signals becomes higher.

As described in the foregoing, the dual band cellular telephone of the invention has a compact structure and is manufactured with a reduced cost.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention.

What is claimed is:

1. A method for selecting a transmission intermediate frequency in a cellular telephone having an antenna, a power amplifier, radio frequency (RF) transmission and reception chains, first and second local oscillators, and intermediate frequency (IF) transmission and reception chains, comprising the steps of:
   a) determining center frequencies of respective first and second RF transmission bands;
   b) calculating a difference between the transmission center frequency of the first transmission band and the center frequency of the second transmission band;
   c) multiplying the calculated difference value by a scaling coefficient to calculate a center local oscillating frequency associated with one of the RF transmission bands;
   d) subtracting the transmission center frequency of one of the RF transmission bands from the local oscillating center frequency to determine the transmission intermediate frequency;
   e) adding the intermediate frequency to start and stop frequencies of the transmission radio frequency range of the first band, to determine start and stop frequencies of the first local oscillator for the first band; and
   f) adding the intermediate frequency to the start and stop frequencies of the radio frequency of the second band, and multiplying the added value by the scaling coefficient, to determine start and stop frequencies of the second local oscillator for the second band.

2. The method of claim 1, wherein said first band in said step e) is a higher RF band than said second band.

3. The method of claim 1, wherein said sealing coefficient is about two.

4. The method of claim 1, wherein said local oscillating frequency associated with one of the RF transmission bands in step d) comprises a local oscillating frequency associated with a higher one of the first and second RF transmission bands.

5. A method for selecting a reception intermediate frequency in a cellular telephone having an antenna, a power amplifier, radio frequency (RF) transmission and reception chains, first and second local oscillators, and intermediate frequency transmission and reception chains, comprising the steps of:
   a) determining center frequencies of respective first and second RF reception bands;
   b) calculating a difference between the center frequency of the first reception band and the center frequency of the second reception band;
   c) multiplying the calculated difference value by a sealing coefficient to calculate a center local oscillation frequency of a local oscillation frequency range associated with one of the RF reception bands;
   d) subtracting the reception center frequency of one of RF reception bands from the local oscillating center frequency to determine the reception intermediate frequency;
   e) adding the intermediate frequency to start and stop frequencies of the reception radio frequency range of the first band, to determine start and stop frequencies of the first local oscillator for the first band; and
   f) adding the intermediate frequency to the start and stop frequencies of the radio frequency of the second band, and multiplying the added value by the scaling coefficient, to determine start and stop frequencies of the second local oscillator for the second band.

6. The method of claim 5, wherein said first band is a higher RF band than said second band.

7. The method of claim 6, wherein said scaling coefficient is about two.

8. The method of claim 6, wherein said local oscillating frequency associated with one of the RF reception bands comprises a local oscillating frequency associated with a higher one of the first and second RF reception bands.

9. A cellular telephone capable of operating in a dual band system, comprising:
   a modem for providing a transmit intermediate frequency (IF) signal to a transmit path and for receiving a receive IF signal from a receive path of the cellular telephone;
   said transmit path including a single first local oscillator for providing a transmit local oscillating (LO) signal, a single transmit path mixing stage for mixing the transmit LO signal with the transmit IF signal to produce a transmit radio frequency (RF) signal, first and second transmit RF bandpass filters having different passbands corresponding to respective different transmit frequency bands of the dual band system, wherein signals within only one of said transmit frequency bands are transmitted from the cellular telephone at any given time; and
   said receive path including a bandpass filter section for passing an RF signal received in a receive band of the dual band, a single second local oscillator for providing a receive LO signal, and a single receive path mixing stage for mixing the receive LO signal with the RF signal passed by the bandpass filter section to provide said receive IF signal.

10. The cellular telephone of claim 9, wherein said first and second bandpass filters are connected in parallel.

11. The cellular telephone of claim 9, wherein said bandpass filter section in the receive path comprises third and fourth bandpass filters having different passbands and connected in parallel.

12. The cellular telephone of claim 9, wherein RF frequency separation between transmit and receive in a lower frequency band of said dual band is different from RF frequency separation between transmit and receive for a higher frequency band of said dual band, and said cellular telephone including means for selecting LO frequencies, a transmit IF frequency and a receive IF frequency such that the same IF frequency separation between transmit and receive signals is maintained when operating at any frequency within both operating bands of the dual band.

13. The cellular telephone of claim 12, wherein bandwidth of the high frequency band is different from bandwidth of the lower frequency band.

14. The cellular telephone of claim 12, wherein said means for selecting includes means for selecting an LO frequency when operating at a lower band of the dual band as a fraction of an LO frequency used when operating within a higher band of the dual band.

15. The cellular telephone of claim 14, wherein said fraction comprises one half.

16. The cellular telephone of claim 14, wherein said higher band is about twice said lower band, with different portions of each of said lower and higher bands being allocated for transmit and receive, and wherein said means for selecting includes means for providing overlap between local oscillator frequency ranges for the high band and low band in both the transmit and receive paths.

17. The cellular telephone of claim 9, wherein the same transmit IF frequency is used for both bands of the dual band when transmitting at the center transmit RF frequency of either band.

18. The cellular telephone of claim 9, wherein the same receive IF frequency is used for both bands of the dual band when receiving at the center receive RF frequency of either band.

* * * * *